(12) United States Patent
Neil et al.

(10) Patent No.: US 8,190,712 B2
(45) Date of Patent: *May 29, 2012

(54) WIRELESS COMMUNICATION DEVICE USE OF APPLICATION SERVER APPLICATIONS

(75) Inventors: Tim Neil, Mississauga (CA); Scott Neil, Toronto (CA); Steve Grenier, Georgetown (CA)

(73) Assignee: Research In Motion Limited, Waterlooo (CA)

( * ) Notice: Subject to any disclaimer, the term of this patent is extended or adjusted under 35 U.S.C. 154(b) by 86 days.

This patent is subject to a terminal disclaimer.

(21) Appl. No.: 12/649,528

(22) Filed: Dec. 30, 2009

(65) Prior Publication Data

US 2011/0087725 A9    Apr. 14, 2011

Related U.S. Application Data

(63) Continuation of application No. 10/537,430, filed as application No. PCT/CA2005/000227 on Feb. 22, 2005, now Pat. No. 7,668,937.

(51) Int. Cl.
*G06F 15/16* (2006.01)
(52) U.S. Cl. .................. 709/219; 718/106; 719/314
(58) Field of Classification Search ................ 707/999.1
See application file for complete search history.

(56) References Cited

U.S. PATENT DOCUMENTS

| | | | |
|---|---|---|---|
| 6,067,582 A | 5/2000 | Smith et al. | |
| 6,070,184 A | 5/2000 | Blount et al. | |
| 6,347,398 B1 | 2/2002 | Parthasarathy et al. | |
| 6,438,575 B1 | 8/2002 | Khan et al. | |
| 6,466,937 B1 | 10/2002 | Fascenda | |
| 6,496,979 B1 | 12/2002 | Chen et al. | |
| 6,529,932 B1 | 3/2003 | Dadiomov et al. | |
| 6,559,773 B1 | 5/2003 | Berry | |
| 6,590,589 B1 | 7/2003 | Sluiman et al. | |
| 6,609,150 B2 | 8/2003 | Lee et al. | |
| 6,629,284 B1 | 9/2003 | Leermakers | |
| 6,658,485 B1 | 12/2003 | Baber et al. | |
| 6,665,867 B1 | 12/2003 | Ims et al. | |
| 6,701,521 B1 | 3/2004 | McLlroy et al. | |
| 6,792,607 B1 | 9/2004 | Burd et al. | |
| 6,886,041 B2 | 4/2005 | Messinger et al. | |
| 6,983,338 B2 | 1/2006 | Hadba et al. | |
| 6,988,099 B2 | 1/2006 | Wiser et al. | |
| 6,990,534 B2 | 1/2006 | Mikhailov et al. | |

(Continued)

FOREIGN PATENT DOCUMENTS

EP    1107540    6/2001

(Continued)

OTHER PUBLICATIONS

USPTO Office Communication dated Oct. 7, 2009 in relation to U.S. Appl. No. 10/537,430, filed Jun. 2, 2005.

(Continued)

*Primary Examiner* — Dustin Nguyen
(74) *Attorney, Agent, or Firm* — Novak Druce + Quigg LLP

(57) ABSTRACT

To enable use of an application on an application server at a mobile communication device, at a transaction server, a message received from the mobile is pushed out to the application. Any return messages is routed back to the mobile. The transaction server may use a queue to store all messages destined to a given application and attempt to push all messages on a given queue on receipt of a further message for the queue.

19 Claims, 24 Drawing Sheets

U.S. PATENT DOCUMENTS

| | | |
|---|---|---|
| 7,043,580 B1 | 5/2006 | Heideman et al. |
| 7,114,158 B1 | 9/2006 | Thompson et al. |
| 7,426,653 B2 | 9/2008 | Hu et al. |
| 7,512,668 B2 | 3/2009 | Koegel |
| 2001/0044321 A1 | 11/2001 | Ausems et al. |
| 2002/0026447 A1 | 2/2002 | Matsutsuka et al. |
| 2002/0116698 A1 | 8/2002 | Lurie et al. |
| 2002/0144016 A1 | 10/2002 | Spicer et al. |
| 2002/0181060 A1 | 12/2002 | Huang |
| 2002/0198931 A1 | 12/2002 | Murren et al. |
| 2003/0060896 A9 | 3/2003 | Hulai et al. |
| 2003/0101246 A1 | 5/2003 | Lahti |
| 2003/0105845 A1 | 6/2003 | Leermakers |
| 2003/0217096 A1 | 11/2003 | McKelvie et al. |
| 2004/0103171 A1 | 5/2004 | Mullis et al. |
| 2004/0117439 A1 | 6/2004 | Levett et al. |
| 2004/0255048 A1 | 12/2004 | Lev Ran et al. |

FOREIGN PATENT DOCUMENTS

| | | |
|---|---|---|
| JP | 2001-306308 | 11/2001 |
| WO | 01/48630 A2 | 7/2001 |
| WO | 01/77822 A2 | 10/2001 |

OTHER PUBLICATIONS

USPTO Office Communication dated Apr. 8, 2009 in relation to U.S. Appl. No. 10/537,430, filed Jun. 2, 2005.

USPTO Office Communication dated Nov. 26, 2008 in relation to U.S. Appl. No. 10/537,430, filed Jun. 2, 2005.

USPTO Office Communication dated Apr. 2, 2008 in relation to U.S. Appl. No. 10/537,430, filed Jun. 2, 2005.

English Translation of Abstract of JP 2001-306308, David Holy, "Method for Defining Class of Data Centre Application", Nov. 2, 2001, esp@cenet database—Patent Abstracts of Japan.

```
<ARML>
    <SCREEN>
        <MENU>
            <MENUITEM>
                <EVENTS>
                    <ACTION>...</ACTION>
                </EVENTS>
            </MENUITEM>
        </MENU>
        <BUTTONS>
            (button definitions)
        </BUTTONS>
        <TEXTITEMS>
            (textitem definitions)
        </TEXTITEMS>
        <EDITBOXES>
            (edit box definitions)
        </EDITBOXES>
        <CHOICEITEMS>
            (choice item definitions)
        </CHOICEITEMS>
        <MESSAGEBOXES>
            (message box definitions)
        </MESSAGEBOXES>
        <IMAGES>
            (image definitions)
        </IMAGES>
        <LISTBOXES>
            (list box definitions)
        </LISTBOXES>
        <CHECKBOXES>
            (check box definitions)
        </CHECKBOXES>
    </SCREEN>
</ARML>
```

FIGURE 5

```
private void _Send(int applicationID, int mobileID, String
                    message,
                int messageType)
            {
                try
                {
    // Insert message into the application queue
                    ...

// Lookup delivery type and push details for application
String sql = "SELECT LNGDELIVERYTYPE, TXTDELIVERYDETAILS, " +
    "FROM TBLAPPLICATIONS WHERE LNGID = " + applicationID;

IDataReader reader = ExecuteQuery(sql);
                if (!reader.Read())
                    throw new Exception("...");

int deliveryType = (int)reader["LNGDELIVERYTYPE"];
            String deliveryDetails =
        (String)reader["TXTDELIVERYDETAILS"];

if (deliveryType != POLL_HTTP)
                {
    // This application uses a push delivery type
    IAIRIXEnterpriseWakeup entWakeup = (IAIRIXEnterpriseWakeup)
            Marshal.BindToMoniker("queue:/new:" +

"Nextair.AIRIX.Server.Enterprise.Router.AIRIXEnterpriseWakeup");
            entWakeup.Wakeup(applicationID, deliveryType,
                    deliveryDetails);
                }
            }
```

FIGURE 8

```
                    public void Retry()
                    {
// Select all push-enabled applications that have expired
                        queued messages
     string sql = "SELECT DISTINCT LNGAPPLICATIONID,
             LNGDELIVERYTYPE, " +
                     "TXTDELIVERYDETAILS " +
         "FROM TBLAPPLICATIONS A, TBLAPPLICATIONQUEUE Q " +
           "WHERE A.LNGDELIVERYTYPE <> " + POLL_HTTP +
              "AND Q.LNGAPPLICATIONID = A.LNGID " +
                 "Q.DTMQUEUED < " + expiryDate;

// Get a disconnected list of apps to retry
        NextairDisconnectedDataProvider dp = new
           NextairDisconnectedDataProvider();
          DataSet ds = dp.ExecuteQuery(sql);
       foreach (DataRow row in ds.Tables[0].Rows)
                        {
             int appID = (int)row["LNGID"];
      int deliveryType = (int)row["LNGDELIVERYTYPE"];
string deliveryDetails = (string)row["TXTDELIVERYDETAILS"];

// Call the Wakeup method for this application asyncronously
   IAIRIXEnterpriseWakeup entWakeup = (IAIRIXEnterpriseWakeup)
               Marshal.BindToMoniker("queue:/new:" +

"Nextair.AIRIX.Server.Enterprise.Router.AIRIXEnterpriseWakeup");
      entWakeup.Wakeup(appID, deliveryType, deliveryDetails);
                        }
                    }
```

FIGURE 9

```
public class AIRIXLockManager
{
    private static Object lockSync = new Object();
    private static Hashtable locks = new Hashtable();

public static bool ObtainLock(int lockID)
    {
        // Make sure only one caller can attempt to obtain a lock at
                              once.
        // We don't bother locking per application, since this method
                              is
        // expected to execute extremely quickly.
        lock (lockSync)
        {
            if (!locks.Contains(lockID))
            {
                // This is the first attempt to lock this lock ID
                locks[lockID] = true;
                return true;
            } if (locks[lockID])
                return false; // this ID is already locked

// Can successfully obtain the lock for this lock ID
            locks[lockID] = true;
            return true;
        }
    } public static void ReleaseLock(int lockID)
    {
        lock (lockSync)
        {
            locks[lockID] = false;
        }
    }
}
```

FIGURE 10

```
[InterfaceQueuing]
    public interface IAIRIXEnterpriseWakeup
        {
    void Wakeup(int appID, int deliveryType, String
                deliveryDetails);
        } public class AIRIXEnterpriseWakeup :
        NextairDatabase, IAIRIXEnterpriseWakeup
                {
            private bool _clustered = false;
    private String _lockProvider = String.Empty;

public void OnConstruct(String constructString)
                {
        _clustered = ...; // read config from config
                    if (_clustered)
_lockProvider = ...; // read lock server location from
                        config
                } private bool _obtainLock(int appID)
                {
                if (_clustered)
    return RemotingServer.ObtainLock(appID); // call remoting
                        server
                            else
    return AIRIXLockManager.ObtainLock(appID); // obtain local
                        lock
                } private void _releaseLock(int appID)
                {
                if (_clustered)
RemotingServer.ReleaseLock(appID); // call remoting server
                            else
AIRIXLockManager.ReleaseLock(appID); // release local lock
                } public void Wakeup(int appID, int deliveryType,
                String deliveryDetails)
                {
                if (_obtainLock(appID))
                    {
                        try
                        {
// Obtain a disconnected list of queued messages, ordered
                // oldest -> newest.
        DataSet messages = RetrieveQueuedMessages(appID);
```

FIGURE 11A

```
// Loop through each queued message and attempt to push
                              it
foreach (DataRow msg in messages.Tables[0].Rows)
                             {
       AIRIXEnterprisePushBase pushObj = null;
                             try
                              {
     pushObj = _createPushComponent(deliveryType);
               if (pushObj == null)
    ... // unable to create push component for delivery
                            type // Synchronously push this message out
int result = pushObj.Push(appID, (int)msg["LNGID"],
           (int)msg["LNGMESSAGETYPEID"],
    (String)msg["VARMOBILEID"], deliveryDetails);

if (!AIRIXConstants.Succeeded(result))
        ... // throw exception so that pushing stops
                             }
              catch (Exception x)
                             {
   ... // log this push msg error and break out of push
                           loop
                             }
                          finally
                             {
NextairServicedComponent.DisposeComponent(pushObj);
                             }
                          }
                          }
                       finally
                          {
         _releaseLock(appID);
                          }
                         }
                        }
                       }
```

FIGURE 11B

```
public interface IAIRIXEnterprisePush
{
// Called by AIRIX to push an application-bound message out
  bool AIRIXReceiveData(int appID, string mobileID, string
                        data);

// Called by AIRIX when a mobile-bound message delivery fails
  bool AIRIXDeliveryError(int appID, string mobileID, string
                        data,
       int errorCode, string errorDescription);

// Called by AIRIX when a mobile-bound message is delivered
  bool AIRIXDeliveryNotify(int appID, string mobileID, string
                        data);
}
```

FIGURE 12

```
public class AIRIXEnterprisePushBase : NextairDatabase
{
    protected int moveQueueToLog(int queueID)
    {
        // Move the specified message from the Application Queue
        // to the Application Log, and return an appropriate
        // AIRIXConstants result.
        ...
    } public int Push(int appID, int queueID, String message,
int messageType, String mobileID, String deliveryDetails)
    {
        IAIRIXEnterprisePush pushClient = null;
        try
        {
            // Move the message from the queue to the log first. It will be
            // rolled back if the PUSH fails.
            int result = moveQueueToLog(queueID);
            if (!AIRIXConstants.Succeeded(result))
                ... // abort the transaction and return error // Create an instance of IAIRIXEnterprisePush.
            // This logic is left up the the child class, since this process
            // can differ depending on the type of communication used.
            pushClient = createPushClient(appID, deliveryDetails);

if (pushClient == null)
                throw new Exception("Invalid interface reference.");

// Push the message out using the retrieved interface
            bool success = false;
            switch (messageType)
            {
                case MessageTypes.APPLICATION_DATA:
                    success = pushClient.AIRIXReceiveData(appID,
                              mobileID, message);
                    break;

case MessageTypes.DELIVERY_CONFIRMATION:
                    success = pushClient.AIRIXDeliveryNotify(appID,
                              mobileID, message);
                    break;

case MessageTypes.FAILURE_NOTIFICATION:
                    int errorCode = getErrorCode(message);
                    int errorMsg  = getErrorMsg(message);
                    success = pushClient.AIRIXDeliveryError(appID,
                              mobileID, message, errorCode, errorMsg);
                    break;
```

FIGURE 13A

```
                                default:
                    throw new Exception("Invalid message type: " +
                            messageType);
                    }
                    if (!success)
                    {
            // Log error or warning and exit...
                        _SetAbort();
                return AIRIXConstants.ENTERPRISE_PUSH_FAILED;
                    } return AIRIXConstants.SUCCESS;
                }
                catch (Exception x)
                {
                    // Log error...
                    _SetAbort();
        return AIRIXConstants.ENTERPRISE_PUSH_UNKNOWN_ERROR;
                }
                finally
                {
                    if (pushClient != null)
                        disposePushClient(pushClient);
                    _SetComplete();
                }
            }

// Abstract method that children will implement to do the work
        // of pushing the message to an application.
    protected abstract IAIRIXEnterprisePush createPushClient(int
                            appID,
                    String deliveryDetails);

// Overridable method that children can implement to provide
     // component specific cleanup of the IAIRIXEnterprisePush
                            client
        // created via the createPushClient method.
        protected void disposePushClient(IAIRIXEnterprisePush
                        pushClient)
                {
            // Base class implementation does nothing.
    // Children can optionally override this to perform explicit
        // cleaning up of the previously created push client
                    component.
                }
            }
```

FIGURE 13B

```
               [
    uuid(EF2795BE-3874-4ACF-A087-8113FB791211),
               version(1.0),
    helpstring("IAIRIXEnterprisePush Library")
               ]
         library IAIRIXEnterprisePush
               {
           importlib("STDOLE2.TLB");

[
    uuid(E7C20DA3-6820-4D3D-8E5C-A8BE61BFDFFE),
               version(1.0),
               dual,
               oleautomation
               ]
    interface IAIRIXEnterprisePush: IDispatch
               {
             [id(0x00000001)]
    HRESULT _stdcall AIRIXReceiveData([in] long appID,
        [in] BSTR mobileID, [in] BSTR data,
        [out, retval] VARIANT_BOOL * Result);

[id(0x00000002)]
    HRESULT _stdcall AIRIXDeliveryError([in] long appID,
    [in] BSTR mobileID, [in] BSTR data, [in] long errorCode,
           [in] BSTR errorDescription,
        [out, retval] VARIANT_BOOL * Result);

[id(0x00000003)]
    HRESULT _stdcall AIRIXDeliveryNotify([in] long appID,
        [in] BSTR mobileID, [in] BSTR data,
        [out, retval] VARIANT_BOOL * Result);
               };
               };
```

FIGURE 14

```
protected IAIRIXEnterprisePush createPushClient(int appID,
                String deliveryDetails)
                        {
    // Get type/interface information from COM object
    Type type = Type.GetTypeFromProgID(deliveryDetails);
                if (type == null)
        throw new Exception("Unable to create COM object: " +
                                    deliveryDetails);

// Create an instance of the COM object
    Object instance = Activator.CreateInstance(type);
        if (!(instance is IAIRIXEnterprisePush))
    throw new Exception("COM object does not implement the "
                        +
                        "IAIRIXEnterprisePush interface.");

return (IAIRIXEnterprisePush)instance;
                        }
```

FIGURE 15

```
// Called by the ATS to deliver application-bound messages
bool AIRIXReceiveData(int appID, String mobileID, String data);

// Called by the ATS when a mobile-bound message delivery fails
bool AIRIXDeliveryError(int appID, String mobileID, String data,
            int errorCode, String errorDescription);

// Called by the ATS when a mobile-bound message is
//      successfully delivered.
bool AIRIXDeliveryNotify(int appID, String mobileID, String
                                data);
```

FIGURE 16

```
// Import the WSDL definition into a CodeDom namespace
        ServiceDescriptionImporter imp = new
                ServiceDescriptionImporter();
    DiscoveryProtocol dcp = new DiscoveryProtocol();
          dcp.DiscoverAny(wsdlLocation);
                dcp.ResolveAll();
      foreach (object o in dcp.Documents.Values)
                      {
              if (o is ServiceDescription)
  imp.AddServiceDescription((ServiceDescription)o, null, null);
                if (o is XmlSchema)
              imp.Schemas.Add((XmlSchema)o);
                      }
          CodeNamespace ns = new CodeNamespace(
      "Nextair.AIRIX.Server.Enterprise.Push.WSDL");
               imp.ProtocolName = "Soap";
                 imp.Import(ns, null);

// Verify that all classes in the namespace have the proper
                       signature
        bool m1 = false, m2 = false, m3 = false;
       foreach (CodeTypeDeclaration t in ns.Types)
                       {
            if (t.IsClass && t.Name == typeName)
                       {
          foreach (CodeTypeMember m in t.Members)
                       {
         if (m.Name == "AIRIXReceiveData") m1 = true;
      else if (m.Name == "AIRIXDeliveryError") m2 = true;
      else if (m.Name == "AIRIXDeliveryNotify") m3 = true;
                       }
         t.BaseTypes.Add("Nextair.AIRIX.Server.Enterprise." +
                "Push.IAIRIXEnterprisePush");
                     break;
                       }
                       }
              if (!(m1 && m2 && m3))
       throw new Exception("Incomplete interface definition.");
```

FIGURE 17A

```
// Generate source code from the imported web service
CSharpCodeProvider provider = new CsharpCodeProvider();
    ICodeGenerator gen = provider.CreateGenerator();
        StringBuilder sb = new StringBuilder();
        StringWriter sw = new StringWriter(sb);
    gen.GenerateCodeFromNamespace(ns, sw, null);
        string sourceCode = sb.ToString();
                sb.Close();

// Compile the proxy assembly
    CompilerParameters cp = new CompilerParameters();
            cp.GenerateExecutable = false;
             cp.GenerateInMemory = false;
          cp.IncludeDebugInformation = false;
        cp.ReferencedAssemblies.Add("System.dll");
      cp.ReferencedAssemblies.Add("System.Xml.dll");
 cp.ReferencedAssemblies.Add("System.Web.Services.dll");
      cp.ReferencedAssemblies.Add("System.Data.dll");
            cp.ReferencedAssemblies.Add(
      typeof(IAIRIXEnterprisePush).Assembly.Location);
cp.OutputAssembly = proxyDir + applicationID.ToString() + ".dll";
        ICodeCompiler compiler = cscp.CreateCompiler();
                 CompilerResults results;
  results = compiler.CompileAssemblyFromSource(cp, sourceCode);
               if (results.Errors.Count > 0)
            throw new Exception("Build failed.");

// Cache handle to compiled assembly and add the soap interface
                            proxy
    // type to the static list of cached proxies.
         Assembly asm = results.CompiledAssembly;
              Type proxyType = asm.GetType(
    "Nextair.AIRIX.Server.Enterprise.WSDL." + typeName, true,
                             true);
         cachedProxies[wsdlLocation] = proxyType;
```

FIGURE 17B

```
protected IAIRIXEnterprisePush createPushClient(
        int appID, String deliveryDetails)
                {
// Pull service location and name out of delivery details xml
        XmlDocument xml = new XmlDocument();
            xml.LoadXml(deliveryDetails);
                string serviceUrl =
    xml.DocumentElement.Attributes["Url"].Value;
                string serviceName =
    xml.DocumentElement.Attributes["Name"].Value;

// If the proxy for this service url is not yet cached,
                // build and cache it now.
        if (!cachedProxies.Contains(serviceUrl))
        _buildSoapProxy(serviceUrl, serviceName);

// Create an instance of the soap proxy for this web service
        Type type = (Type)cachedProxies[serviceUrl];
            IAIRIXEnterprisePush pushClient =
    (IAIRIXEnterprisePush)Activator.CreateInstance(type);
                if (push == null)
    throw new Exception("Unable to create proxy instance.");

return (pushClient);
                }
```

FIGURE 18

```
public IAIRIXEnterprisePush createPushClient(int appID,
                String deliveryDetails)
        {
        // Retrieve delivery information
        XmlDocument xml = new XmlDocument();
            xml.LoadXml(deliveryDetails);
                string serviceName =
        xml.DocumentElement.Attributes["Name"].Value;
                int servicePort = Int32.Parse(
        xml.DocumentElement.Attributes["Port"].Value);
                string serviceLocation =
        xml.DocumentElement.Attributes["Location"].Value;

// Return a remote instance of IAIRIXEnterprisePush
        return (IAIRIXEnterprisePush)Activator.GetObject(
                typeof(IAIRIXEnterprisePush),
        "tcp://" + serviceLocation + ":" + servicePort + "/" +
                        serviceName);
                }
```

FIGURE 19

```
private void RetryTimer(object sender, EventArgs e)
        {
    AIRIXEnterpriseRouter router = null;
                    try
                    {
    router = new AIRIXEnterpriseRouter();
                router.Retry();
                    }
            catch (Exception x)
                    {
                    ...
                    }
                 finally
                    {
NextairServicedComponent.DisposeComponent(router);
                    }
                }
```

FIGURE 20

```
// Register a tcp channel for listening for remoting requests
TcpChannel channel = new TcpChannel(configuredPortNumber);
        ChannelServices.RegisterChannel(channel);

// Expose the AIRIXRemotingLockManager as a singleton type
        lockManager = new AIRIXRemotingLockManager();
    RemotingServices.Marshal(lockManager, "LockManager");
```

FIGURE 21

WIRELESS COMMUNICATION DEVICE USE OF APPLICATION SERVER APPLICATIONS

CROSS-REFERENCE TO RELATED APPLICATION

This application is a continuation of application Ser. No. 10/537,430 filed Jun. 2, 2005, which issued as U.S. Pat. No. 7,668,937, which is the national stage of International Application No. PCT/CA2005/000227 filed Feb. 22, 2005, the contents of which are hereby incorporated by reference.

BACKGROUND OF THE INVENTION

This invention relates to a transaction server, and a method, for enabling use of an application on an application server at a mobile communication device.

Wireless connectivity is a feature of the modern telecommunications environment. An increasing range of people are using a wide variety of wireless data networks to access corporate data applications.

However, there are numerous competing mobile (i.e., wireless) devices that can be used to achieve this. Each device has its own operating system and its own display characteristics. Operating systems are not mutually compatible, nor are the display characteristics—some are color, some are black and white, some are text-only, some are pictorial.

At the same time, an increasing number of mobile device users are people without a technical background or high level of educational achievement. Such people are often intimidated by the need to run complex installation programs. Furthermore, at present, such installation programs generally depend on cable connections to a personal computer by the means of a cradle or other such device.

Therefore, a mechanism whereby a mobile client for a server side application may be enabled for multiple wireless devices with minimal modification of the application at the server is required. Such a mechanism is described in U.S. publication no. 2003/0060896 to Hulai et al., published Mar. 27, 2003, the contents of which are incorporated by reference herein. Nevertheless, an improved mechanism would be desirable.

SUMMARY OF THE INVENTION

To enable use of an application on an application server at a mobile communication device, at a transaction server, a message received from the mobile is pushed out to the application. Any return messages is sent back to the mobile. The transaction server may use a queue to store all messages destined to a given application and attempt to push all messages on a given queue on receipt of a further message for the queue.

According to the present invention, there is provided a method of enabling use of an application server application by a wireless communication device comprising, at a transaction server: on receipt of a given message from said wireless communication device for said application on said application server, pushing said given message, and each message queued on a queue for said application, toward a destination for said application of said application server.

According to another aspect of the present invention there is provided a transaction server enabling use of at least one application server application by a wireless communication device, comprising: a memory storing at least one queue, with one queue being provided for each of said at least one application on said application server; a processor for, on receipt of a given message from said wireless communication device for a given application on said application server: pushing said given message, and each message queued on a queue for said application, toward a destination for said application of said application server.

According to a further aspect of the present invention there is provided a method, at a transaction server, for allowing use of an application on an application server at a mobile communication device, comprising: receiving from said mobile a mobile data containing package; pushing said mobile data containing package to said application server; receiving from said application server a server data containing package; and forwarding said server data containing package to said mobile.

Other features and advantages will become apparent from the following description in conjunction with the drawings.

BRIEF DESCRIPTION OF THE DRAWINGS

In figures which illustrate, by way of example, embodiments of the present invention, FIG. 1 schematically illustrates a mobile device adapted for use with the present invention;

FIG. 5 illustrates computer code for an exemplary application definition;

FIGS. 8 to 10, 11A, 11B, 12, 13A, 13B, 14 to 16, 17A, 17B, and 18 to 21 illustrate example pseudo-code for implementing aspects of the subjection invention.

DETAILED DESCRIPTION

Figure 1:
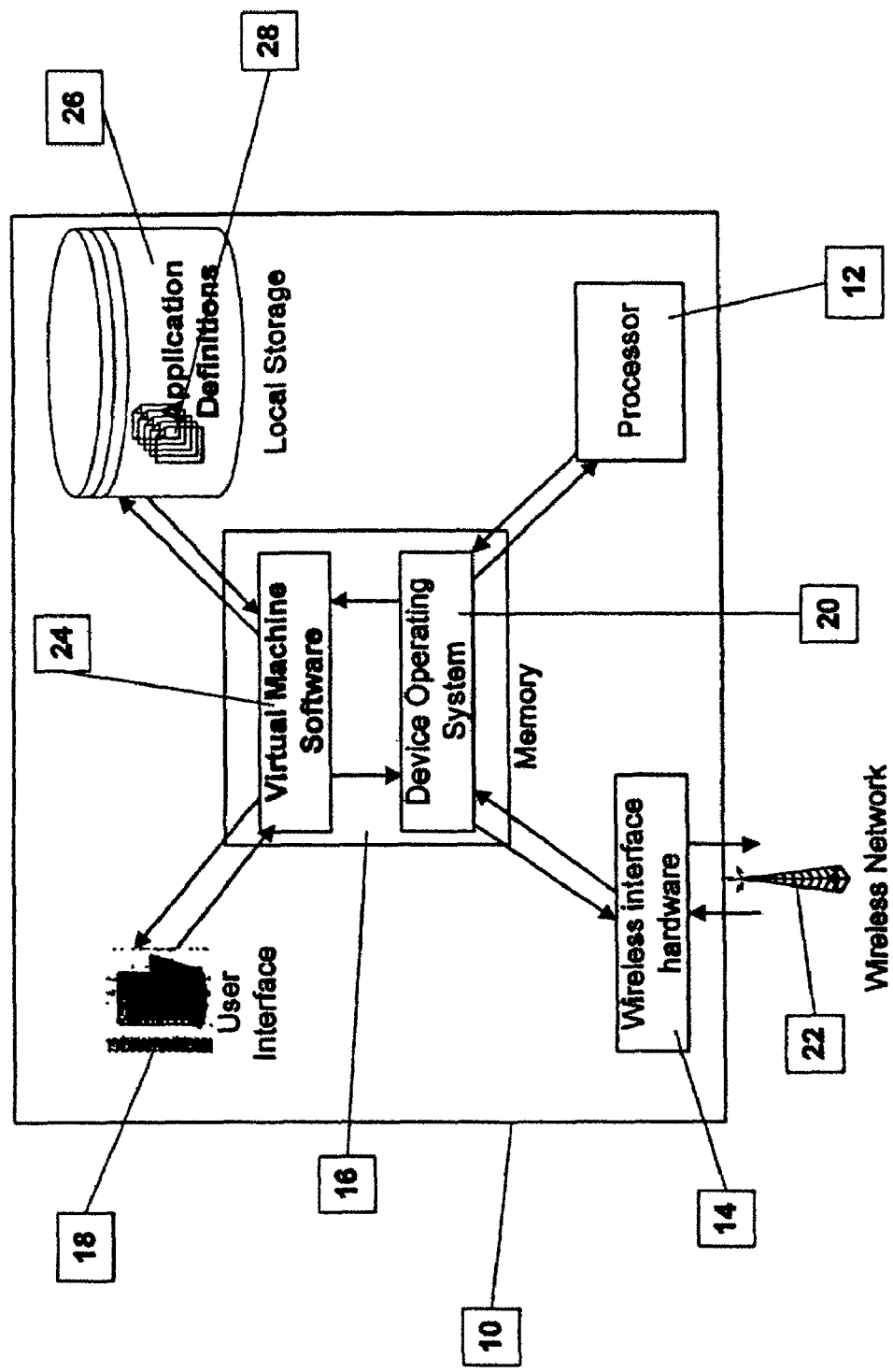

In overview, to adapt a wireless communication device (mobile) to use applications on application servers, a virtual machine (VM) is loaded on to the mobile. The VM is specific to the operating system used by the mobile and is configured to handle a communications language. For example, the VM may be configured to handle extensible mark-up language (XML) and, in particular, particular XML entities that may be defined to facilitate use of a server application at the mobile. Thereafter, to adapt the mobile to use a specific application on an application server, an application definition file for the specific application is loaded into the VM. Amongst other things, the application definition file will tell the VM how to configure the display of the mobile, where and how to place data received from the application on its display, and what actions to take in response to user input.

The VM is arranged to communicate with a wirelessly reachable transaction server. The transaction server sends any XML packages which it receives from a VM of a mobile and which are intended for an application to the appropriate application server.

To adapt an application on an application server for operating system independent mobile use, the application itself, or a wrapper around the application, accepts XML packages originating from mobiles and extracts the data from the packages. This data is then reformatted into the usual format expected by the application using a pre-defined model. The reformatted data is then processed in the usual manner by the application. Return data from the application to a mobile is composed into extensible mark-up language (XML) packages and sent to the transaction server. The transaction server then forwards these packages to the appropriate mobile.

The flow of data is improved if the transaction server can push XML packages to the application server, rather than only sending packages when polled. To allow this, the application server implements an exposed interface which acts as a destination for incoming messages for one or more applications. The interface is constructed as a listening interface which will process any packages that it receives. Suitable protocols to expose the interface are Component Object Model (COM), Distributed COM, Simple Object Access Protocol (SOAP), .NET, and .NET Remoting. The interface itself is constructed (in any suitable language, such as Visual Basic, Delphi, C#, or Java) so that it will process any packages it receives.

The transaction server queues messages received from mobiles that are intended for a given application on a queue, normally a first-in-first-out (FIFO) queue. Each time a new message for the given application arrives, the transaction server queues it, endeavours to obtain a lock on the exposed interface, then dequeues and logs the first message on the queue and pushes it to the interface. Dequeuing, logging, and pushing continues until the queue is empty or until a push fails. (A push is judged to have failed if the application server returns a message indicating the push failed or if any communications protocol layer generates a time-out failure in conjunction with a push attempt.) If the push of a given message fails, the logged copy of the message is rolled back to the front of the queue and the dequeuing and pushing operation is aborted. Once dequeuing and pushing ceases, either due to the queue being emptied or the operation being aborted, the lock on the exposed interface of the application server is released.

While dequeuing and pushing to the given application recommences upon the queuing of each new message for the given application, since messages to an application may be only sporadically received, the transaction server may also re-initiate de-queuing and pushing after a retry interval.

FIG. 1 illustrates a mobile device 10, which may be any conventional wireless communication device adapted for using applications of an application server. As such, mobile device 10 includes a processor 12, in communication with a network interface 14, storage memory 16, and a user interface 18 typically including a keypad and/or touch-screen. Network interface 14 enables device 10 to transmit and receive data over a wireless network 22. Mobile device 10 may be, for example, a Research in Motion (RIM) two-way paging device, a WinCE based device, a PalmOS device, a WAP enabled mobile telephone, or the like. Memory 16 of device 10 stores a mobile operating system such as the PalmOS, or WinCE operating system software 20. Operating system software 20 typically includes graphical user interface and network interface software having suitable application programming interfaces ("API's") for use by other applications executing at device 10.

Memory at device 10 further stores virtual machine software 24 which, when executed by mobile device 10, enables device 10 to present an interface for server side applications. Specifically, virtual machine software 24 interprets an application definition file defining a user interface 18 controlling application functionality and the display format (including display flow) at device 10 for a particular server-side application, the format of data to be exchanged over the wireless network for the application, and the format of data to be stored locally at device 10 for the application. Virtual machine software 24 uses operating system 20 and associated APIs to interact with device 10, in accordance with the received application definition file. In this way, device 10 may present interfaces for a variety of different applications. Moreover, multiple wireless devices each having similar virtual machine software 24 and an application definition file particular to a given application may each use the given application.

As such, the exemplary virtual machine software 24 is specifically adapted to work with the particular mobile device 10. Thus if device 10 is a RIM pager, virtual machine software 24 is a RIM virtual machine. Similarly, if device 10 is a PalmOS or WinCE device, virtual machine software 24 would be a PalmOS or a WinCE virtual machine. As further illustrated in FIG. 1, virtual machine software 24 is capable of accessing local storage 28 at device 10.

An exemplary application definition file may be formed using a markup language, like XML. To facilitate use of applications at the mobile, defined XML entities may be understood (i.e., supported) by the virtual machine software 24. Defined XML entities are further detailed hereinafter. The defined XML entities are interpreted by the virtual machine software 24, and may be used as building blocks to present server-side applications at mobile device 10.

Figure 2:
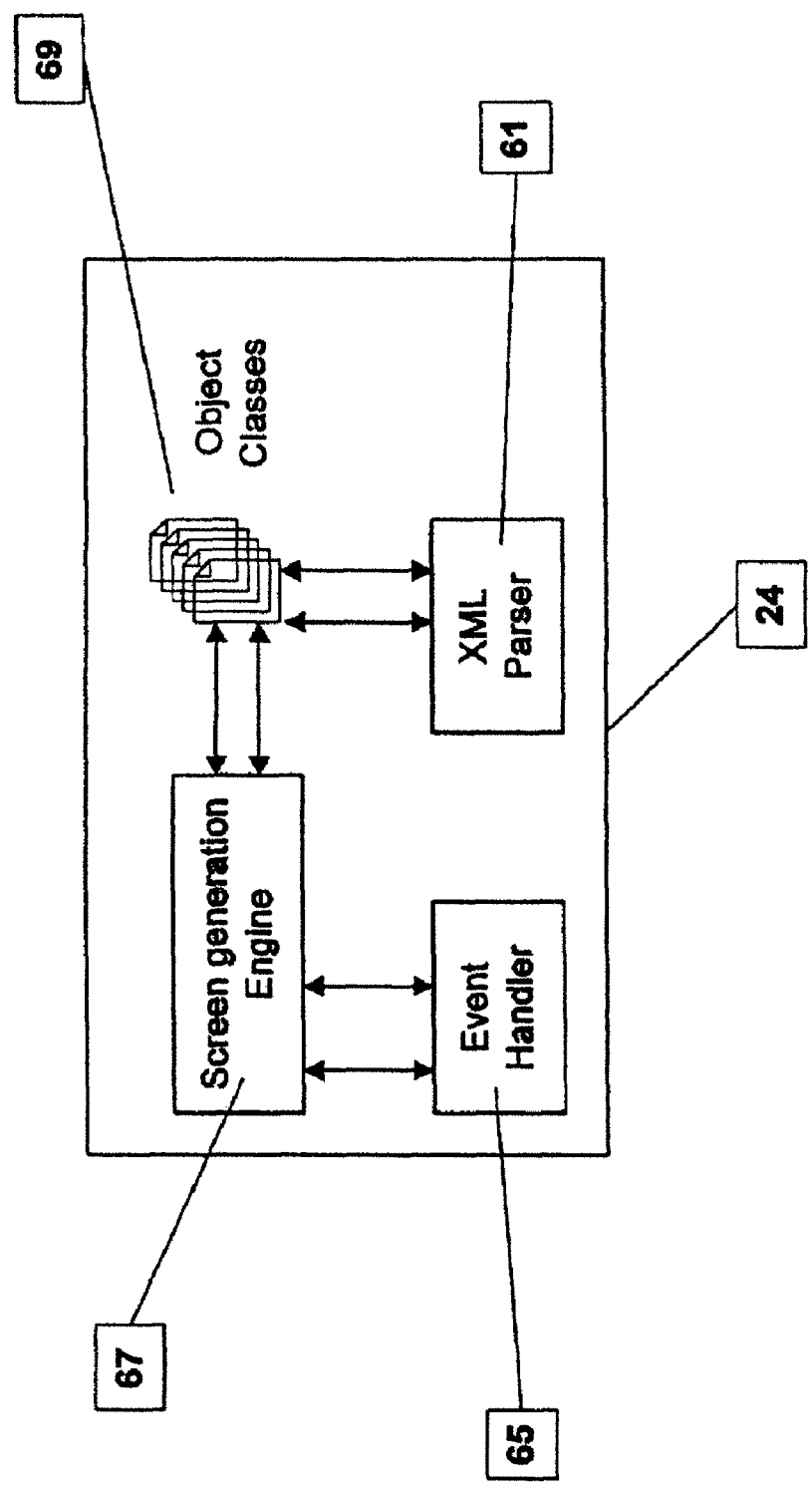
FIG. 2 further illustrates the organization of virtual machine software which is part of the mobile device of FIG. 1.

Specifically, as illustrated in FIG. 2, virtual machine software 24 includes a conventional XML parser 61; an event handler 65; a screen generation engine 67; and object classes 69 corresponding to XML entities supported by the virtual machine software 24, and possibly contained within an application definition file.

XML parser 61 may be formed in accordance with the Document Object Model, or DOM, available at http://www.w3.org/DOW, the contents of which are hereby incorporated by reference. Parser 61 enables virtual machine software 24 to read an application description file. Using the parser, the virtual machine software 24 may form a binary representation of the application definition file for storage at the mobile device, thereby eliminating the need to parse text each time an application is used. Parser 61 may convert each XML tag contained in the application definition file, and its associated data to tokens, for later processing. As will become apparent, this may avoid the need to repeatedly parse the text of an application description file.

Screen generation engine 67 displays initial and subsequent screens at the mobile device, in accordance with an application description file 28.

Event handler 65, of virtual machine software 24 allows device 10 under control of virtual machine software 24 to react to certain external events. Example events include user interaction with presented screens or display elements, incoming messages received from a wireless network, or the like.

Object classes 69 define objects that allow device 10 to process each of the supported XML entities at the mobile device. Each of object classes 69 includes attributes used to store parameters defined by the XML file, and functions allowing the XML entity to be processed at the mobile device for each supported XML entity. So, as should be apparent, supported XML entities are extensible.

Upon invocation of a particular application at mobile device 10, the virtual machine software 24 presents an initial screen based on the contents of the application definition file 28. Screen elements are created by screen generation engine 67 by creating instances of corresponding object classes for defined elements, as contained within object classes 69. The object instances are created using attributes contained in the application definition file 28. Thereafter the event handler 65 of the virtual machine software 24 reacts to events for the application. Again, the event handler consults the contents of the application definition file for the application in order to properly react to events. Events may be reacted to by creating instances of associated "action" objects, from object classes 69 of virtual machine software 24.

Similarly, object classes 69 of virtual machine software 24 further include object classes corresponding to data tables and network transactions. At run time, instances of object classes corresponding to these classes are created and populated with parameters contained within application definition file, as required.

Using this description, persons of ordinary skill in the art will be able to form virtual machine software 24 for any particular device. Typically, virtual machine software 24 may be formed using conventional object oriented programming techniques, and existing device libraries and APIs, as to function as detailed herein. As will be appreciated, the particular format of screen generation engine 67, object classes 69 will vary depending on the type of virtual machine software, its operating system and API available at the device. Once formed, a machine executable version of virtual machine software 24 may be loaded and stored at a mobile device, using conventional techniques. It can be embedded in ROM, loaded into RAM over a network, or from a computer readable medium. Although, in the preferred embodiment the virtual machine software 24 is formed using object oriented structures, persons of ordinary skill will readily appreciate that other approaches could be used to form suitable virtual machine software. Operation of virtual machine software 24 under control of an application definition is further detailed below.

Figure 3:
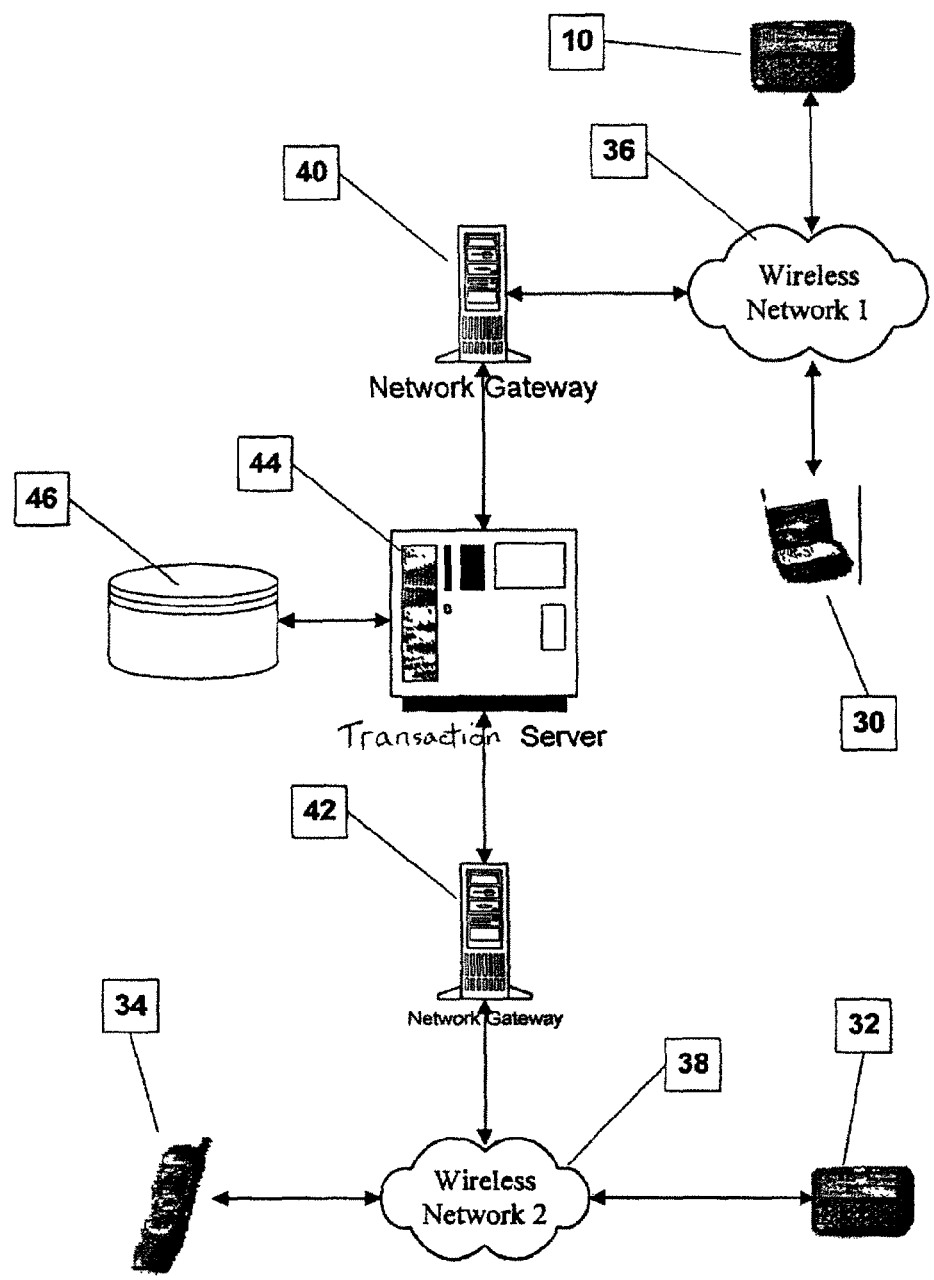
FIG. 3 illustrates an operating environment for the device of FIG. 1.

FIG. 3 illustrates the operating environment for a mobile device 10. Further example mobile devices 30, 32 and 34 are also illustrated in FIG. 3. These mobile devices 30, 32 and 34 are similar to device 10 and also store and execute virtual machine software exemplary of an embodiment of the present invention.

Virtual machine software like that stored at device 10, executes on each mobile device 10, 30, 32, 34, and communicates with a transaction server 44 by way of example wireless networks 36 and 38 and network gateways 40 and 42. Example gateways 40 and 42 are generally available as a service for those people wishing to have data access to wireless networks. An example network gateway is available from Broadbeam Corporation in association with the trademark SystemsGo!. Wireless networks 36 and 38 are further connected to one or more computer data networks, such as the Internet and/or private data networks by way of gateway 40 or 42. As will be appreciated, the invention may work with many types of wireless networks. Transaction server 44 is in turn in communication with a data network, that is in communication with wireless network 36 and 38. The communication used for such communication is via TCP/IP over an HTTP transport. As could be appreciated, other network protocols such as X.25 or SNA could equally be used for this purpose.

Devices 10, 30, 32, and 34 communicate with transaction server 44 in two ways. First, virtual machine software 24 at each device may query transaction server 44 for a list of applications that a user of an associated mobile device 10,30, 32 or 34 can make use of. If a user decides to use a particular application, device 10, 30, 32 or 34 can download a text description, in the form of an application definition file, for the application from the transaction server 44 over its wireless interface. As noted, the text description is preferably formatted using XML. Second, virtual machine software 24 may send, receive, present, and locally store data related to the execution of applications, or its own internal operations. The format of exchanged data for each application is defined by an application description file that is part of the application definition file. Again, the exchanged data is formatted using XML, in accordance with the application description file.

Transaction server 44, in turn, stores application definition files for those applications that have been enabled to work with the various devices 10, 30, 32, and 34 using virtual machine software 24 in a pre-defined format understood by virtual machine software 24. Software providing the functions of the transaction server 44, in the exemplary embodiment is written in Delphi, using an SQL Server database.

As noted, text files defining application definitions and data may be formatted in XML. For example XML version 1.0, detailed in the XML version 1.0 specification second edition, dated Oct. 6, 2000 and available at the internet address "http://www.w3.org/TR/2000/REC-xml-2000-1006", the contents of which are hereby incorporated herein by reference, may be used. However, as will be appreciated by those of ordinary skill in the art, the functionality of storing XML description files is not dependent on the use of any given programming language or database system.

Figure 7:
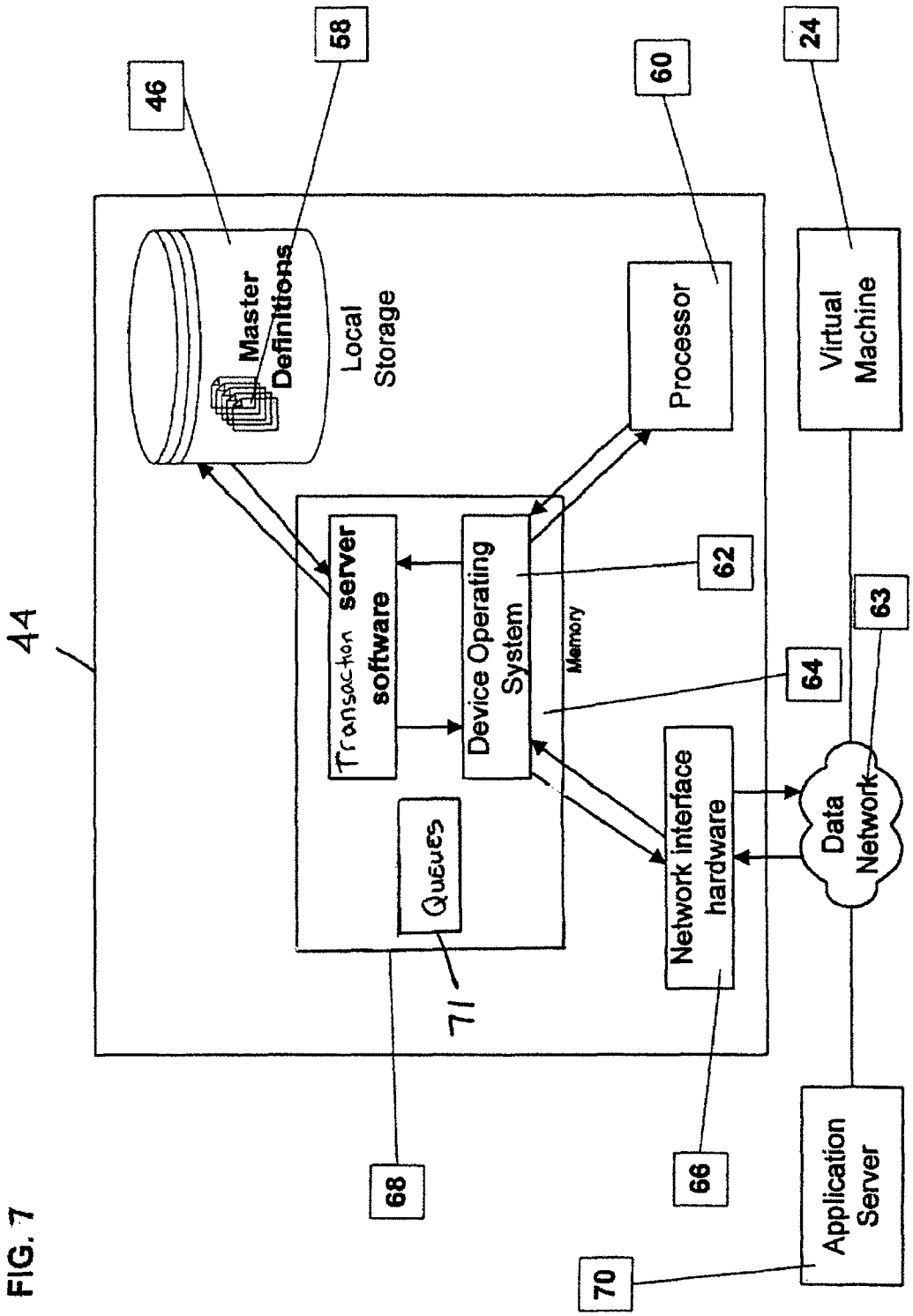
FIG. 7 schematically illustrates the transaction server which is part of FIG. 3, exemplary of an embodiment of the present invention.

Each application definition file is formatted according to defined rules and uses pre-determined XML markup tags, known by both virtual machine software 24, and complementary transaction server software 68 (FIG. 7). These defined tags are the aforereferenced defined XML entities. Thus, the tags define XML entities used as building blocks to present an application at a mobile device. Knowledge of these rules, and an understanding of how each tag and section of text should be interpreted, allows virtual machine software 24 to process an XML application definition and thereafter execute an application. Virtual machine software 24 effectively acts as an interpreter for a given application definition file.

Figure 4:
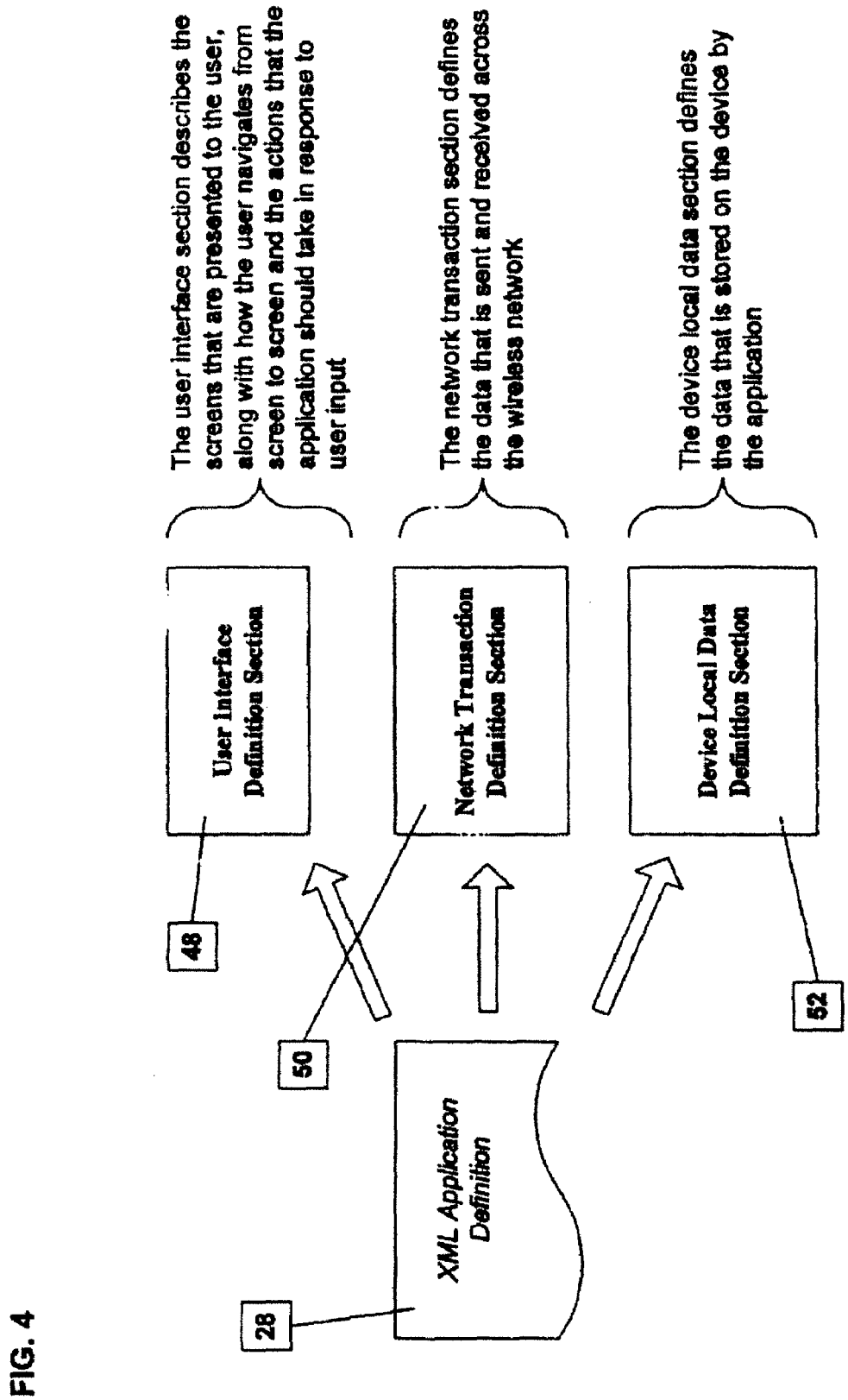
FIG. 4 illustrates the structure of example application definitions stored at the transaction server of FIG. 3 used by the device of FIG. 1.

FIG. 4 illustrates an example format for an XML application definition file 28. As illustrated, the example application definition file 28 for a given device and application includes three components: a user interface definition section 48, specific to the user interface for the device 10, and defining the format of screen or screens for the application and how the user interacts with them; a network transactions definition section 50 defining the format of data to be exchanged with the application; and a local data definition section 52 defining the format of data to be stored locally on the mobile device by the application.

Defined XML markup tags correspond to XML entities supported at a device, and are used to create an application definition file 28. The defined tags may broadly be classified into three categories, corresponding to the three sections 48, 50 and 52 of an application definition file 28. As noted above, virtual machine software 24 at a mobile device includes object classes corresponding to each of the XML tags. At run time, instances of the objects are created as required.

Broadly, the following example XML tags may be used to define the user interface definition:

SCREEN—this defines a screen. A SCREEN tag pair contains the definitions of the user interface elements (buttons, radio buttons, and the like) and the events associated with the screen and its elements.

BUTTON—this tag defines a button and its associated attributes

LIST—this tag defines a list box

CHOICEBOX—this tag defines a choice item, that allows selection of a value from predefined list MENU—the application developer will use this tag to define a menu for a given screen EDITBOX—this tag defines an edit box TEXT ITEM—this tag describes a text label that is displayed CHECKBOX—this tag describes a checkbox HELP—this tag can define a help topic that is used by another element on the screen IMAGE—this tag describes an image that appears on those displays that support images ICON—this tag describes an icon EVENT—this defines an event to be processed by the virtual machine software. Events can be defined against the application as a whole, individual screens or individual items on a given screen. Sample events would be receipt of data over the wireless interface, or a edit of text in an edit box ACTION—this describes a particular action that might be associated with an event handler. Sample actions would be navigating to a new window or displaying a message box.

For example, a screen tag could have the structure illustrated in FIG. 5. Each of the tags within the screen tag (such as the ACTION tag and the IMAGES tag) has no attributes.

The second category of example XML tags describes the network transaction section 50 of application definition 28. These may include the following example XML tags.

TABLEUPDATE—using this tag, the application developer can define an update that is performed to a table in the device's local storage. Attributes allow the update to be performed against multiple rows in a given table at once.

PACKAGEFIELD—this tag is used to define a field in a data package that passes over the wireless interface.

The third category of XML tags used to describe an application are those used to define a logical database that may be stored at the mobile device. The tags available that may be used in this section are as follows.

TABLE—this tag, and its attributes, define a table. Contained within a pair of TABLE tags are definitions of the fields contained in that table. The attributes of a table control such standard relational database functions as the primary key for the table.

FIELD—this tag describes a field and its attributes. Attributes of a field are those found in a standard relational database system, such as the data type, whether the field relates to one in a different table, the need to index the field, and so on.

As well as these XML tags, virtual machine software 24 may, from time to time, need to perform certain administrative functions on behalf of a user. In order to do this, one of object classes 69 has its own repertoire of tags to communicate its needs to the transaction server 44. Such tags differ from the previous three groupings in that they do not form part of an application definition file, but are solely used for administrative communications between the virtual machine software 24 and the transaction server 44. Data packages using these tags are composed and sent due to user interactions with the virtual machine's configuration screens. The tags used for this include the following.

REG—this allows the application to register and deregister a user for use with the transaction server.

FINDAPPS—by using this operation, users can interrogate the server for the list of applications that are available to them.

APP REG—using this operation, the end-user can register (or deregister) for an application and have the application interface downloaded automatically to their device (or remove the interface description from the device's local storage).

SETACTIVE—If the user's preferred device is malfunctioning, or out of power or coverage, they will need a mechanism to tell the Server to attempt delivery to a different device. The SETACTIVE command allows the user to set the device that they are currently using as their active one.

Figure 6:
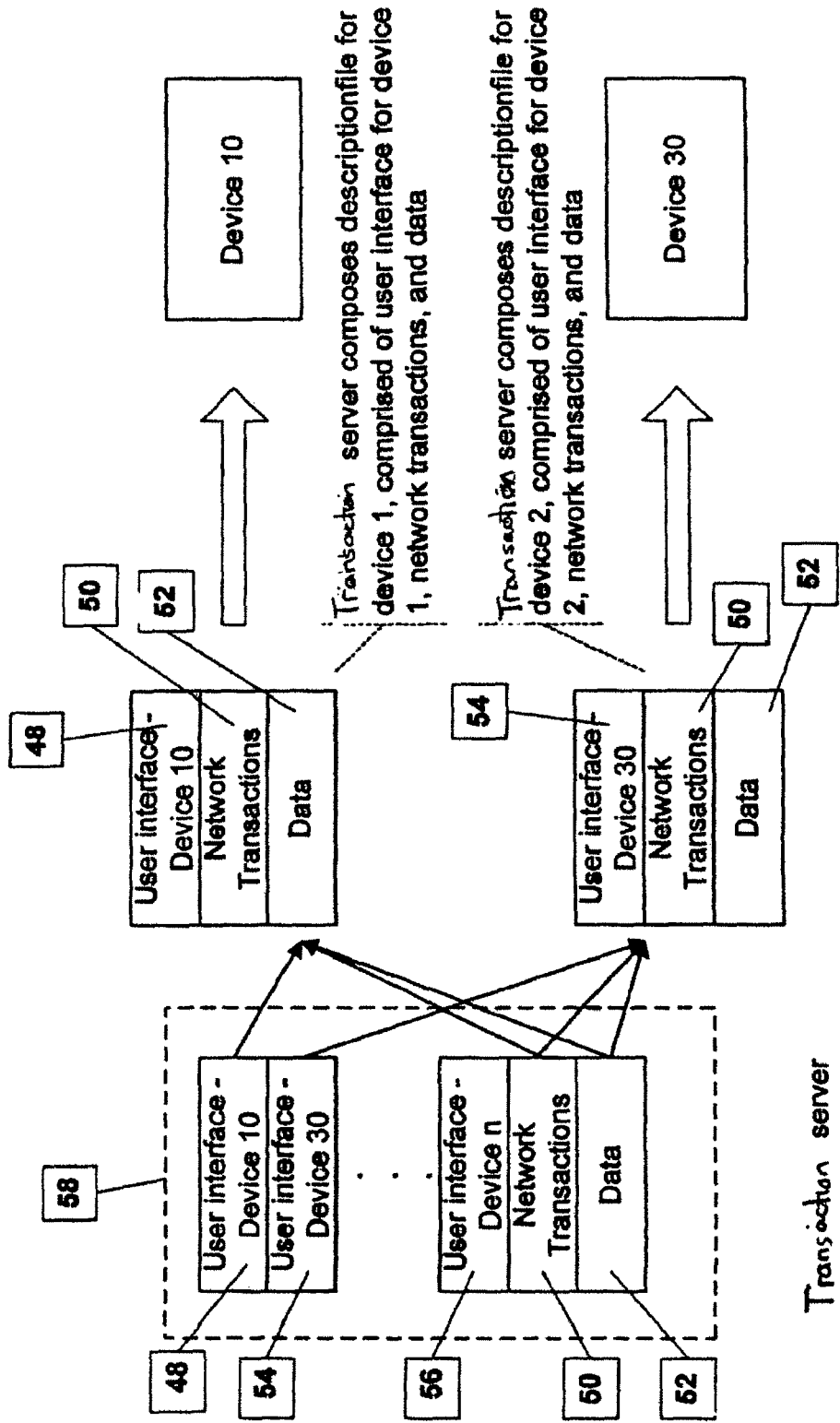
FIG. 6 schematically illustrates the formation of application definition files at a transaction server of FIG. 2.

FIG. 6 illustrates the organization of application definitions at transaction server 44 and how transaction server 44 may form an application definition file 28 (FIG. 4) for a given device 10, 30, 32 or 34. In the illustration of FIG. 6, only two mobile devices 10 and 30 are considered. Typically, since network transactions and local data are the same across devices, the only piece of the application definition that varies for different devices is the user interface definition.

So, transaction server 44 stores a master definition 58 for a given server side application. This master definition 58 contains example user interface descriptions 48, 54, 56 for each possible mobile device 10, 30, 32; descriptions of the network transactions 50 that are possible and data descriptions 52 of the data to be stored locally on the mobile device. Preferably, the network transactions 50 and data descriptions 52 will be the same for all mobile devices 10, 30 and 32.

For device 10, transaction server 44 composes an application definition file 28 by querying the device type and adding an appropriate user interface description 48 for device 10 to the definitions for the network transactions 50 and the data 52. For device 30, transaction server 44 composes the application definition by adding the user interface description 54 for device 10 to the definitions for the network transactions 50 and data 52.

The master definition 58 for a given application is created away from the transaction server and loaded onto the transaction server by administrative staff charged with its operation. Master definition files could be created either by use of a simple text editor, or by a graphical file generation tool. Such a tool might generate part or all of the file, using knowledge of the XML formatting rules, based on the user's interaction with screen painters, graphical data definition tools and the like.

FIG. 7 illustrates the organization of transaction server 44 and associated master definitions. Transaction server 44 may be any conventional application server, modified to function in manners exemplary of the present invention. As such, transaction server 44 includes a processor 60, in communication with a network interface 66 and storage memory 64. Transaction server 44 may be, for example, be a Windows™ NT server, a Sun Solaris™ server, or the like. Memory of transaction server 44 stores an operating system such as Windows NT™, or Solaris™ operating system software 62.

Network interface 66 enables transaction server 44 to transmit and receive data over a data network 63. Transmissions are used to communicate with both the virtual machine software 24 (via the wireless networks 36, 38 and wireless gateways 40,42) and one or more application servers, such as application server 70, that are the end recipients of data sent from the mobile client applications and the generators of data that is sent to the mobile client applications.

Memory at transaction server 44 further stores software 68, exemplary of an embodiment of the present invention. Transaction server software 68, when executed by transaction server 44 enables the transaction server to understand and compose XML data packages that are sent and received by the transaction server. These packages may be exchanged between transaction server 44 and the virtual machine software 24, or between the transaction server 44 and the application server 70. As described more fully hereinafter, the transaction server queues packages from mobiles intended for each different application on a different queue of queues 71 in memory 68.

The communication protocol between the application server 70 and the transaction server 44 is dependent upon the manner in which the application server 70 is configured. For example, where the application server is configured so that it exposes a SOAP interface, communication between the application server 70 and the transaction server 44 uses HTTP running on top of a standard TCP/IP stack. An HTTP connection between a running application at the application server 70 and the transaction server 44 is established in response to the application at a mobile device presenting the application. The server side application provides output to transaction server 44 over this connection. The server side application data is formatted into appropriate XML data packages understood by the virtual machine software 24 at a mobile device by the server side application.

That is, a server side application formats application output into XML in a manner consistent with the format defined by the application definition file for the application. Alternatively, an interface component separate from the application (which may be considered a wrapper around the application) could easily be formed with an understanding of the format and output for a particular application. That is, with a knowledge of the format of data provided and expected by an application at application server 70, an interface component could be a produced using techniques readily understood by those of ordinary skill. The interface portion could translate application output to XML, as expected by transaction server 44. Similarly, the interface portion may translate XML input from a mobile device into a format understood by the server side application.

The particular identity of the mobile device on which the application is to be presented may be identified by a suitable identifier, in the form of a header contained in the server side application output. This header may be used by transaction server 44 to forward the data to the appropriate mobile device. Alternatively, the identity of the connection could be used to forward the data to the appropriate mobile device.

The application server 70 may either be configured to poll the transaction server 44 for messages queued to an application on server 70 or the transaction server 44 may push messages on a queue toward the application on the server 70. To support the latter operation, the server requires an exposed listening interface. The interface may be one of a COM, DCOM, SOAP, .NET, or .NETRemoting interface which has been configured for listening.

In the following, the transaction server is sometimes referred to as an ATS. Further, the application server is sometimes referred to as an enterprise server (since the application server and the mobiles which utilise applications on the application server are often part of the same enterprise). Additionally, the defined XML entities supported by the VM of the mobiles may be referred to hereinafter as ARML entities. The exemplary implementation at the Transaction Server presented here following is described in the context of the Microsoft .NET infrastructure running in a Windows™ environment, but could equally be implemented in the same manner in a JAVA, J2EE, or other transactional containered environment.

The requirement is quite simply to PUSH a message from the ATS to the Enterprise server. The following three components will make a PUSH mechanism successful:

1) The ARML application defines a delivery type (e.g. push via COM, SOAP, .NET, etc), and the associated details.
2) The ATS implements the logic to push the message.
3) The ATS implements a mechanism by which message delivery is guaranteed, even when an application is temporarily offline during an attempt to push a message. Therefore, the ATS implements some form of automatic retry logic.

In addition, the ATS ensures that all messages delivered to enterprise applications are delivered in the order in which they were received.

Incoming messages from mobiles are handled by the ATS in the same manner irrespective of whether the ATS forwards these messages on to the enterprise server as a result of polling or by pushing. In this regard, a method (which may be named the AIRIXEnterpriseRouter.SendApplicationMessage) is called, which results in the application-bound message being placed in the queue of queues 71 (FIG. 7) which is specific for the Application (TBLAPPLICATIONQUEUE) to which the message is bound. If the enterprise server polls, then this is all the ATS does—it leaves the message in the Application Queue for the enterprise application to pick up via the PULL delivery type.

If the ATS is aware that a given application on the enterprise server is configured to accept PUSHES of a particular delivery type (e.g., SOAP delivery type), then in addition to the above logic, a _Send method in an AIRIXEnterpriseRouter object will now call the a new AIRIXEnterpriseWakeup component asynchronously. This component (described in greater detail hereinafter) will be responsible for pushing all queued messages for an application out. The AIRIXEnterpriseWakeup component will in turn call one of several new push specific components, namely:

AIRIXEnterprisePushCOM
AIRIXEnterprisePushSOAP
AIRIXEnterprisePushRemoting

These new components may be part of an application namespace called Nextair.AIRIX.Server.Enterprise.Push.

Without any special handling, this solution could easily result in duplicate messages being pushed to an enterprise application. To combat this problem, the AIRIXEnterpriseWakeup components first attempts to obtain a lock for the application it wants to push to. If this lock is successfully obtained, the AIRIXEnterpriseWakeup component proceeds to push all queued messages for the application, and release the lock when finished. Otherwise, if the AIRIXEnterpriseWakeup component cannot obtain the lock, it will do nothing (immediately exit, without error). Finally, where the Transaction Server is scaled sideways (i.e. works in a clustered environment), the application locks are held in a central location—otherwise it would be possible for different machines (referencing the same backend database) to attempt pushing the same messages at once—resulting in duplicate (and possibly out of order) messages. The details for a suitable locking mechanism are discussed hereinafter.

In the case where an enterprise application is currently offline when the ATS attempts to push to it, the pushing attempt will terminate and the remaining messages will be left in the application queue. Again, without special handling, an attempt to push these remaining messages to an application would not occur until the next message was received from a mobile for that application (which, for low volume installations, could be quite a long time). In order to prevent this from happening, an automatic retry mechanism may be implemented whereby the ATS will automatically check for old queued messages every X minutes (on a timer). If old queued messages are found, the AIRIXEnterpriseWakeup object will be fired for the appropriate application.

Upon successful insertion of the application-bound message into the ATS Application Queue, the AIRIXEnterpriseRouter will:

Lookup the delivery type and push details for the appropriate application.

If the application is a PUSH delivery type (anything other than PULL), call the AIRIXEnterpriseWakeup component, asynchronously, triggering a push of the new message (and any other queued messages for the application).

FIG. 8 illustrates pseudo-code for implementing the asynchronous call to the AIRIXEnterpriseWakeup component from the AIRIXEnterpriseRouter_Send method.

The AIRIXEnterpriseRouter will also contain a new method called Retry. This method may be called by a Retry Service (further detailed hereinafter) to automatically retry sending/pushing any expired queued messages. The method will simply retrieve a list of push-enabled applications that have outstanding queued messages, and call the Wakeup method against the AIRIXEnterpriseWakeup component for each application. A simple implementation (without error handling) is set out in FIG. 9.

Ideally, an error trying to create the AIRIXEnterpriseWakeup component in the _Send method should not result in the transaction being rolled back. Instead, an error can be logged, and the retry left up to the built-in automatic retry mechanism of the ATS.

The AIRIXEnterpriseWakeup .NET queued component is responsible for initiating pushing to applications. This component ideally can be called asynchronously by other components to ensure that lengthy enterprise pushes do not prevent other code from executing.

This class will belong to the Nextair.AIRIX.Server.Enterprise.Router namespace.

AIRIXEnterpriseWakeup will be a .NET queued component containing a single exposed method called Wakeup. This method will be called primarily by the AIRIXEnterpriseRouter component when an application-bound message comes in from a mobile. The automatic push retry mechanism of the ATS will also call this component on a regular configurable interval.

A call to the Wakeup method of this component signifies a request to push all currently queued messages for an application. Because the AIRIXEnterpriseWakeup component is a COM+ (pooled) component, it is possible that (without some special handling) two or more AIRIXEnterpriseWakeup components could be attempting to push messages to a single application at the same time. To resolve this issue, the Wakeup method will try to obtain a "push lock" for the application it needs to push to, before actually doing the work. If the lock can be obtained, this component will proceed to attempt to push all queued messages for the application. Otherwise, if the lock cannot be obtained, the Wakeup method will do nothing (because another Wakeup component currently owns the lock).

In order to support sideways scaling of the Transaction Server (for high volume, hosting type installation scenarios), the ATS needs to be capable of holding these "locks" in a central location—one that all AIRIXEnterpriseWakeup components, on all participating Transaction Servers can use to obtain and release locks. At the same time, since it is much more likely that the Transaction Server will not be scaled sideways, ideally there should also be a faster, and less dependent locking mechanism that does not need to communicate across application (or machine) boundaries. The locking implementation for both of these scenarios is explained below.

An AIRIXLockManager Class (which is a .NET class) can contain the logic required for obtaining and releasing locks for multiple resources, where a resource is a push-enabled application activated on an ATS. Since pushing to one application should not be dependent on pushing to other applications, this class will be able to keep track of and manage independent locks for multiple applications. The basic implementation for this class is shown in FIG. 10.

Both the AIRIXEnterpriseWakeup component and a Remote Locking Service (detailed hereafter) will use the above lock class to hand out application locks. Since the AIRIXEnterpriseWakeup component and the Transaction Server will be hosted in different application spaces, they will not share the static members of the lock class. The reason for having this lock object located in both places is so that the Transaction Server can use a central locking location (i.e. located in the Remote Locking Service) in the rare case where the ATS needs to be scaled to multiple machines. The Remote Locking Service will expose the lock object via a .NET Remoting interface, which all cooperating ATS machines will need to query for obtaining and releasing locks. However, since .NET Remoting requires extra overhead (i.e. TCP/IP communication over a specific port), it is also preferable to have the ability to obtain locks without having this Remoting overhead. Therefore, the lock object located in the AIRIXEnterpriseWakeup component will be used when the ATS is installed solely on a single server machine.

The COM+ construct string for the AIRIXEnterpriseWakeup component will contain an XML configuration string indicating:

Whether the ATS should run in clustered mode (off by default).

If specified to run in clustered mode (above), the computer name (or IP address) and port for the Remote Locking Service interface to be used as the central lock provider (normally one of the machines in the cluster).

When called, the Wakeup method in the AIRIXEnterpriseWakeup component will perform the following:

Attempt to obtain a lock for the specified application. If the lock can be obtained (i.e. is not already obtained by another caller), then:

Create an instance of the appropriate AIRIXEnterprisePushBase descendent component (depending on the passed in delivery type).

Call the Push method on the created push component, passing it the application ID, delivery type, and delivery details for the application to push messages out to.

A basic implementation of the AIRIXEnterpriseWakeup component is shown in FIGS. 11A and 11B This component should have attributes such that object pooling is enabled, object construction is enabled, and it has a transactional type of "Required".

Any single push message failure during the execution of the Wakeup method should result in the termination of the pushing attempt, followed by a release of the application lock. With this approach, in combination with the fact that a trailing message in a FIFO queue is not pushed until the message in the queue immediately preceding it is known to have been successfully pushed, ensures that messages are sent sequentially (in the order they were received). The push attempt will be retried either the next time an application-bound message is received from a mobile for that application, or when the automatic push retry is executed (whichever comes first). In this regard, it will be recalled that a push message failure is judged to have occurred when the enterprise server returns a message indicating the failure or when, during a push attempt, a communications protocol layer times out.

An interface called IAIRIXEnterprisePush may serve as a base type for all descendent classes that need to implement PUSH functionality. This class may belong to a namespace identified as the Nextair.AIRIX.Server.Enterprise.Push.

The actual use of this class is documented hereinafter, however, the C# source code for this interface definition is shown in FIG. 12.

An enterprise push abstract base class can be created, which will parent all push implementation classes. This abstract class can provide common functionality to all of its child classes. The class can belong to a namespace identified as Nextair.AIRIX.Server.Enterprise.Push namespace.

The AIRIXEnterprisePushBase class can inherit Nextair-Database, which provides general database access and component services routines. This abstract base class will provide basic functionality required from all push components. The class will initially provide a single public method (called Push). The Push method will provide a base implementation of a message push. It will call the abstract createPushClient method to do the actual work of connecting to and/or obtaining a reference to an IAIRIXEnterprisePush object that can be used to push a message out. Since this method is abstract, all children classes will need to implement it. The template of FIGS. 13A and 13B suggests a basic implementation for this class.

Since the sending of an actual message to an enterprise application is a non-transactional request, the moveQueue-ToLog method should be called before attempting to push a message out (as can be seen in the sample implementation above). If the push fails, the transaction will be aborted, causing moveQueueToLog to be rolled back. Note that if this were done in the reverse order, the push could succeed, then MoveQueueToLog could fail—in which case the push would not be able to be rolled back (because it is non-transactional), and a duplicate message would eventually be delivered to the enterprise application.

In the event that MoveQueueToLog fails, the transaction should be aborted and the caller (child class) should not attempt to push the message.

The following discusses suitable implementations for the delivery types COM, DCOM, SOAP, .Net, and .NetRemoting.

To configure the Transaction Server so as to be able to push application-bounds messages to enterprise server applications via COM, a COM push can be created in a namespace identified as Nextair.AIRIX.Server.Enterprise.Push. The Transaction Server can provide a COM interface that can be exposed by enterprise applications wishing to receive application bound data via COM. This interface may be deployed with the Transaction Server (in a "lib" directory), and will be a simple COM type library file (.tlb) that can be imported by Enterprise Application developers and implemented.

The COM interface will declare the following methods:
AIRIXReceiveData—Called by the ATS when a message is to be pushed to an enterprise application.
AIRIXDeliveryError—Called by the ATS when an error occurs trying to deliver a message to a mobile.
AIRIXDeliveryNotify—Called by the ATS when a message is successfully delivered to a mobile.

The MIDL skeleton code of FIG. 14 declares the COM interface enterprise applications will need to implement to receive COM PUSH messages from the ATS.

In order for the ATS to successfully push a message to a COM based enterprise application, the COM component developed for the enterprise application should meet the following requirements:

1) Implement the IAIRIXEnterprisePush COM interface exposed by the Transaction Server (in the ATS "lib" directory).
2) Register the COM component on the Transaction Server machine. Note that communication over DCOM is also possible provided the appropriate DCOM settings are applied to the component on the ATS machine.
3) Specify the ProgID (Class and CoClass) of the COM component (for example, "DispatchForce.AIRIXReceive") in the delivery details of the application, which is provisioned via the Transaction Server Console.

A .NET Serviced Component named AIRIXEnterprisePushCOM inherits from AIRIXEnterprisePushBase and handles the actual pushing of data (via COM) to enterprise applications. The implementation of the AIRIXEnterprisePushBase createPushClient method for this class will create an instance of the COM component that is specified in the delivery details of the associated application. The "delivery details" string for COM PUSH enabled applications is simply the ProgID (Class.CoClass) of the COM component to push to. The pseudo-code of FIG. 15. shows a basic implementation of the createPushClient method for the AIRIXEnterprisePushCOM component (without error handling).

To allow pushing via SOAP, a push component capable of executing method calls against a Web Service via SOAP over HTTP is needed. The location (URL) and identity of the web service will be retrieved at runtime. This class can also belong to the Nextair.AIRIX.Server.Enterprise.Push namespace.

The SOAP PUSH delivery method will allow enterprise application developers to integrate with the Transaction Server from virtual any platform. This delivery type is intended for use by enterprise applications that meet one or more of the following criteria: Are not hosted on a Microsoft Windows-based platform (or that run on top of a non-Microsoft virtual machine, such as a Java VM)
1) Are not written in a .NET compatible language (i.e. legacy C++, VB, Delphi, etc)
2) Require secure communications between the Transaction Server and the Enterprise Application (sometimes required when the Enterprise Application is not located on the same LAN as the ATS).

Enterprise Applications wishing to use the SOAP PUSH delivery type expose a WSDL interface containing the interface methods shown in FIG. 16 (which are the same as the methods declared in the IAIRIXEnterprisePush interface).

Once the above methods are implemented in an exposed web service, the Enterprise Application needs only to tell the Transaction Server where to find the WSDL file and what the name of the exposed service is. This information may be specified in the delivery details configuration for the ATS application definition as follows:
<Service Url="http://myweb/testsvc.asmx" Name=" . . . " />

Enterprise Application developers and/or ATS administrators will not need to know the format of the above construct string, as the Transaction Server Console will provide an intuitive interface for entering this information if the SOAP PUSH Delivery type is selected.

The new AIRIXEnterprisePushSOAP ATS component will extend AIRIXEnterprisePushBase. Its "createPushClient" implementation will do the work of pushing the specified message to the enterprise application using the application configured WSDL location and Web Service Name. In order to prevent having to parse and reload the entire WSDL document every request (which could be extremely time consuming), the Transaction Server will perform intelligent caching of a pre-compiled proxy assemblies for each SOAP PUSH enabled application. This caching may work as follows:

The first time an enterprise application's WSDL file is accessed, the ATS loads the WSDL file and compiles it into a binary proxy assembly on the ATS machine. This proxy is then used to send SOAP requests to the enterprise application without having to re-parse the entire WSDL document each request.

The AIRIXEnterprisePushSOAP component contains a static HashTable of compiled SOAP proxy assemblies for applications. Since this HashTable is static, it will be shared between all instances of AIRIXEnterprisePushSOAP components. To prevent multiple components from modifying the HashTable simultaneously, the AIRIXEnterprisePushSOAP component should synchronize access to this table.

The code snippet of FIGS. 17A and 17B indicates how this proxy assembly compilation can be accomplished in .NET (note that for simplicity, this code does not contain any error handling).

As noted from the source code above, when initially building the proxy assembly, the compiled proxy class will be forced to implement the IAIRIXEnterprisePush interface. This will both validate that the enterprise application SOAP interface is compliant and it will allow the ATS to communicate to enterprise applications through a handle to this interface. The pseudo-code of FIG. 18 provides a basic implementation of the AIRIXEnterprisePushSOAP.createPushClient method.

Failure to load and/or build the proxy assembly for an enterprise application's WSDL interface should result in exceptions being generated and logged in the ATS. For simplicity, this implementation can require that any interface changes to an enterprise application's WSDL file result in the Transaction Server Component Services application being restarted (so that the WSDL proxy assembly is rebuilt).

For a push component capable of executing method calls against a .NET Remoting interface over a TCP connection, the location (server name or IP address) and identity of the Remoting service can be retrieved at runtime. Again, this class can belong to the Nextair.AIRIX.Server.Enterprise.Push namespace.

.NET Remoting allows applications to communicate across application, machine, and network boundaries. Although Remoting calls can be made over a variety of different underlying network protocols, the most prevalent is TCP.

For present purposes, the Remoting clients and servers will communicate over TCP/IP on a specified port number. From a high level, Remoting servers act like an Object Broker. That is, they simply provide one or more objects to clients. The fact that Remoting is capable of passing objects by reference (instead of requiring complete object serialization like other similar technologies) means that enterprise applications wishing to integrate with the ATS via Remoting will likely experience better performance than they would with SOAP. Also, the binary nature of communication also makes Remoting a more network friendly protocol than SOAP.

In order for an Enterprise Application to receive push messages via Remoting, the enterprise application should meet the following requirements:

Expose a service type (object/interface) that implements the IAIRIXEnterprisePush class (located in the Nextair.AIRIX.Server.Enterprise.Push namespace/assembly).

Provide the following information to the Transaction Server (via the Transaction Server Console application provisioning screens):

Remoting Service Name
Remoting Service Port Number
Machine Name or IP Address

Whether or not the Remoting server interface is registered as a SingleCall or Singleton type is entirely up to the enterprise application developer.

The delivery details string for Remoting push enabled applications can be in the following format:

<Service Name=" . . . " Port=" . . . " Location=" . . . "/>

Implementation of the AIRIXEnterprisePushRemoting component should be relatively straightforward. The Transaction Server simply needs to retrieve the appropriate delivery details from the configuration string, create an instance of a remote IAIRIXEnterprisePush component, and attempt to call the appropriate interface method. The pseudo-code of FIG. 19 suggests a basic implementation.

If the push client (IAIRIXEnterprisePush) cannot be created, the createPushClient method should throw an exception.

As will be understood by those skilled in the art, push delivery can also be extended to additional delivery types.

It is possible with this proposed Push design, that a message could essentially be "stuck" in the application queue. The queues 71 (FIG. 7) may be First-In First-Out and the delivery of all queued messages for a particular application initiated by the queuing of another message. If an attempted push to the Enterprise fails, the message will remain queued until the next message destined for that particular application is queued. Therefore, all queued messages will be "stuck" in the application queue until the next message arrives. This suggests a need for a mechanism by which an attempt to push the message can be initiated by the Transaction Server automatically (even with no new incoming messages).

A service application (simply named Retry Service) can be provided with two main functions:

1) It will initiate a push retry check for applications on a configurable interval.
2) It will expose an interface whereby it can serve as a central "application lock provider". That is, in a clustered type of environment, the service can hand out application locks to push components on one or more machines.

The service can be part of the Nextair.AIRIX.Server namespace.

The service can contain a timer that fires on some configurable interval. This interval can be set in a configuration file for the service. When the timer fires, the service will simply create an instance of the AIRIXEnterpriseRouter component, and call its Retry method. This, in turn, will check for expired messages for all push-enabled applications and attempt to push those messages out. The retry configuration setting of the configuration file for the service will look as follows:

<Retry Interval="RETRY_INTERVAL_SECS"
MsgExpiry="EXPIRY_TIME_SECS"/>

The code snippet of FIG. 20 suggests how this retry timer method could be implemented.

Since the AIRIXEnterpriseRouter Retry method already implements all required retry logic, this is all that is required of the Retry Service to enable automatic retries. Also, since the Retry method in turn calls the AIRIXEnterpriseWakeup component to push messages out, it does not have to worry about pushing duplicate messages (or any other special handling)—this is all done in the Wakeup component.

A Remote Locking Service can contain an interface that is capable of acting as a central application lock provider, distributing application locks to callers from possibly multiple machines. This interface is needed for the rare occasion where a customer will want to scale the Transaction Server sideways (in a clustering environment). Although this interface will exist, by default it will not be used since most ATS installations will consist of a single ATS machine only.

The Remote Locking Service will expose the AIRIXRemotingLockManager object (which will be a remotable interface to the AIRIXLockManager class) via a Remoting interface. When clustering is enabled, this interface will be called by the AIRIXEnterpriseWakeup component to obtain application locks before attempting to push messages to an application. The Remote Locking Service configuration will contain a section that specifies the port number to expose the locking interface on, as follows:

<LockInterface Port="XXXX"/>

The actual code for exposing the AIRIXLockManager to clients is quite simple, and can be implemented in service startup, such as illustrated in FIG. 21.

Note from FIG. 21 that the object is registered as a Singleton type, which means that only one instance of the object will ever be created. This is fine for present purposes since synchronizing occurs inside the locking component, and only a single caller is ever allowed to obtain or release a lock simultaneously. Also, since the AIRIXLockManager contains only static methods and properties, an AIRIXRemotableLockManager class may simply be a marshal-by-reference object that wraps calls to the static AIRIXLockManager class.

Failure to register the AIRIXRemotableLockManager object on the configured port should result in an error being logged. The same goes for a failure to create and call the AIRIXEnterpriseRouter Retry method.

A before noted, the exemplary implementation at the Transaction Server has been described in the context of .NET running on a Windows™ transactional environment, but could equally be implemented in the same manner in another transactional containered environment. Further, while COM, DCOM, SOAP, .NET, and .NET Remoting have been given as example communication interfaces, it will be appreciated that the teachings of this invention extend to any other remote invokable interface, such as COBRA, Tuxedo, or RMI.

While the transaction server has been described as queuing an incoming message and then trying to push each message on the queue, the approach could be modified such that an incoming message is pushed directly to an application if the queue for that application is empty. In this modified approach, if the direct push of the incoming message failed, that message would then need to be queued.

Other modifications will be apparent to those skilled in the art and, therefore, the invention is defined in the claims.

What is claimed is:

1. A method of enabling use of an application server application by a wireless communication device, the method comprising:
   at a transaction server having two alternative modes of execution, the first mode being a clustered mode wherein the transaction server is scaled across multiple machines, the second mode being a non-clustered mode wherein the transaction server runs on a single machine:
      on receipt of a given message from said wireless communication device for said application on said application server, queuing said given message on a queue for said application;
      subsequent to said queuing, pushing said given message toward a destination for said application of said application server, wherein said pushing comprises dequeuing said message from said queue and pushing said message;
      prior to said dequeuing and pushing, acquiring, via a locking mechanism, a lock for said destination on said application server, said lock preventing other use of said destination,
      wherein if said transaction server is executing in said clustered mode, said locking mechanism comprises a lock object on one of said multiple machines, said one machine providing an interface to be used as a central lock provider by each of said multiple machines; and
      wherein if said transaction server is executing in said non-clustered mode, said locking mechanism comprises a lock object that is local to the single machine on which said transaction server runs.

2. The method of claim 1 further comprising, after said dequeuing said message from said queue and pushing said message, releasing said lock for said destination on said application server.

3. The method of claim 1 wherein messages on said queue are queued on a first in first out (FIFO) basis and wherein a trailing message in said queue is not pushed until a message in said queue immediately preceding said trailing message is considered to have successfully reached said destination.

4. The method of claim 3 further comprising:
   if a particular message pushed toward said destination does not successfully reach said destination, ceasing said dequeuing and pushing and re-queuing said particular message on said queue.

5. The method of claim 4 further comprising, on dequeuing said message and prior to pushing said message, logging said event and wherein said re-queuing said particular message comprises utilizing said log to identify messages to re-queue.

6. The method of claim 1 further comprising:
   timing a retry interval and, on expiry of said retry interval, for each message on said queue:
      dequeuing said each message from said queue and pushing said each message toward said destination for said application of said application server.

7. The method of claim 1 wherein said destination is a Component Object Model (COM) interface, a Distributed Component Object Model (DCOM) interface, a Simple Object Access Protocol (SOAP) interface, a .NET interface, or a .NETRemoting interface.

8. The method of claim 1 wherein said transaction server is executing in said clustered mode and wherein said acquiring of said lock comprises sending a lock request to said central lock provider.

9. A method of enabling use of an application server application by a wireless communication device, the method comprising:
   at a transaction server operating in a clustered mode of execution wherein the transaction server is scaled across multiple machines:
      on receipt of a given message from said wireless communication device for said application on said application server, queuing said given message on a queue for said application;
      subsequent to said queuing, pushing said given message, and each message queued on said queue, toward a destination for said application of said application server, wherein said pushing comprises, for each message on said queue, dequeuing said each message from said queue and pushing said each message;
      prior to said dequeuing and pushing, acquiring, via a locking mechanism, a lock for said destination on said application server, said lock preventing other use of said destination, wherein said locking mechanism comprises a lock object on one of said multiple machines, said one machine providing an interface to be used as a central lock provider by each of said multiple machines.

10. The method of claim 9 further comprising, after said dequeuing said each message from said queue and pushing said each message, releasing said lock for said destination on said application server.

11. The method of claim 9 wherein messages on said queue are queued on a first in first out (FIFO) basis and wherein a trailing message in said queue is not pushed until a message in said queue immediately preceding said trailing message is considered to have successfully reached said destination.

12. The method of claim 11 further comprising:
if a particular message pushed toward said destination does not successfully reach said destination, ceasing said dequeuing and pushing and re-queuing said particular message on said queue.

13. The method of claim 12 further comprising, on dequeuing said each message and prior to pushing said each message, logging said event and wherein said re-queuing said particular message comprises utilizing said log to identify messages to re-queue.

14. The method of claim 9 further comprising:
timing a retry interval and, on expiry of said retry interval, for each message on said queue:
dequeuing said each message from said queue and pushing said each message toward said destination for said application of said application server.

15. The method of claim 9 wherein said destination is a Component Object Model (COM) interface, a Distributed Component Object Model (DCOM) interface, a Simple Object Access Protocol (SOAP) interface, a .NET interface, or a .NETRemoting interface.

16. The method of claim 9 wherein said acquiring of said lock comprises sending a lock request to said central lock provider.

17. A transaction server enabling use of at least one application server application by a wireless communication device, said transaction server having two alternative modes of execution, the first mode being a clustered mode wherein the transaction server is scaled across multiple machines, the second mode being a non-clustered mode wherein the transaction server runs on a single machine, the transaction server comprising:
a memory storing at least one queue, with one queue being provided for each of said at least one application on said application server;
a processor for, on receipt of a given message from said wireless communication device for a given application on said application server:
queuing said given message on a queue for said application;
subsequent to said queuing, pushing said given message toward a destination for said application of said application server, wherein said pushing by said processor comprises dequeuing said each message from said queue and pushing said each message;
prior to said dequeuing and pushing, acquiring, via a locking mechanism, a lock for said destination on said application server, said lock preventing other use of said destination,
wherein if said transaction server is executing in said clustered mode, said locking mechanism comprises a lock object on one of said multiple machines, said one machine providing an interface to be used as a central lock provider by each of said multiple machines; and
wherein if said transaction server is executing in said non-clustered mode, said locking mechanism comprises a lock object that is local to the single machine on which said transaction server runs.

18. The transaction server of claim 17 wherein messages on each of said at least one queue are queued on a first in first out basis and wherein said processor is for refraining from pushing a trailing message in said queue until said processor considers a message in said queue immediately preceding said trailing message has successfully reached said destination.

19. The transaction server of claim 18 wherein said processor is further for, if a given message pushed from said given queue toward said destination does not successfully reach said destination, ceasing said dequeuing and pushing and re-queuing said given message on said given queue.

* * * * *